May 9, 1939.  T. W. MULLEN  2,157,183
METHOD OF MAKING A PATCH
Filed Sept. 1, 1937
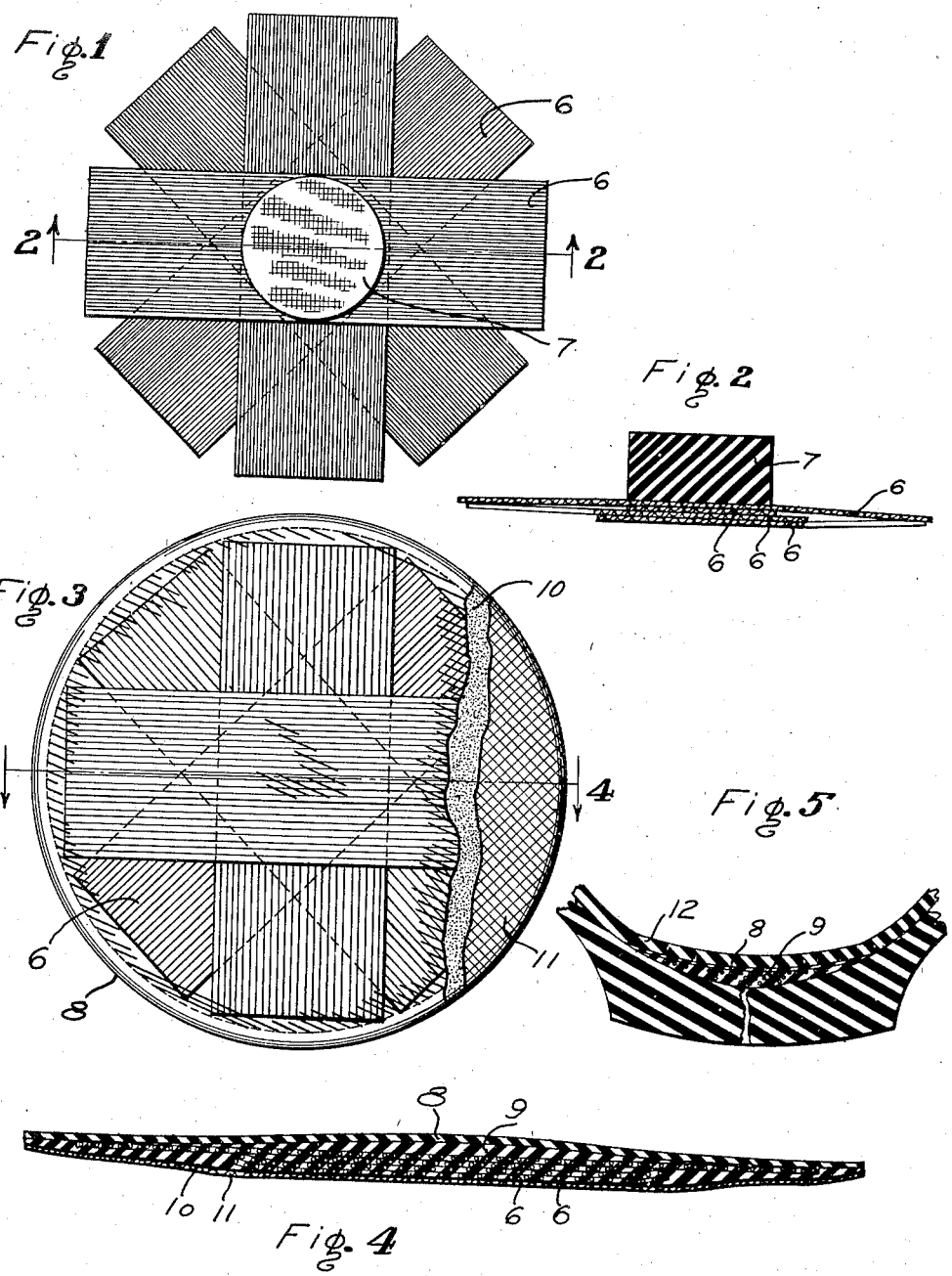
Inventor
Thomas W. Mullen
By
Minturn & Minturn
Attorneys Patented May 9, 1939

2,157,183

UNITED STATES PATENT OFFICE 2,157,183

METHOD OF MAKING A PATCH

Thomas W. Mullen, Indianapolis, Ind., assignor to Bowes Seal Fast Corporation, Indianapolis, Ind., a corporation of Indiana Application September 1, 1937, Serial No. 161,914

9 Claims. (Cl. 154—2)

This invention relates to improvements in making patches for pneumatic casings for motor car tires in which the patch is reenforced with cord fabric and the object of the invention is to stretch the fabric before the patch is applied to the casing and positively hold it in that stretched condition so that it will not continue to stretch by the road pounding to which the casing is subjected in use and bulge out at the rupture in the casing as it would otherwise do.

I accomplish the above and other objects which will hereinafter appear, by the means more or less diagrammatically shown in the accompanying drawing, in which Fig. 1 is a top plan view showing four cord fabric strips crossing each other and having a block of semi-cured rubber positioned thereon, preliminary to the application of pressure;

Fig. 2 is a section of Fig. 1 on the line 3—3;

Fig. 3 is a plan view showing the other side of the fabric from that shown in Fig. 1, after the rubber has been pressed into the fabric to expand the fabric, and also showing the impregnated fabric embodied in a completed patch;

Fig. 4 is a section on the line 4—4 of Fig. 3 with the near side of Fig. 3 reversed in this view; and Fig. 5 is a detail in cross section of a ruptured automobile casing showing my patch applied.

Like characters of reference indicate like parts in the several views of the drawing.

The cord fabric, preferably in strips 6, here shown as four in number, but the number may be more or less than four, are crossed as in Fig. 1, and a block 7 of semi-cured rubber, that is, rubber mixed with ingredients that will vulcanize from heat, is placed as shown in Figs. 1 and 2, over the middle of the crossed strips. Then this assembly is placed in a suitable press and the rubber is flattened out and pressed into the fabric by pressure considerably in excess of anything to which the patch will be subjected in use. This pressure varying from a few hundred pounds per square inch to as many tons, depending upon the size of the patch and its use, and always sufficient to force the rubber to the ends of the strips and preferably somewhat beyond as shown in Fig. 3, forces the rubber into the strips and spreading and lengthening the cords so that the strips are prestretched to the required lengths where they are held by impregnation of the fabric by the rubber and by vulcanizing of the rubber with heat applied while the patch is still in the press.

The rubber is preferably forced, as stated, beyond the limits of the cord strips by the pressure, into a disk formation 8, generally thickest around the middle 9 where the block 7 was originally centered. Then the side of the patch, opposite the formation 8, is coated with a rubber adhesive 10, and this adhesive 10 is covered by a layer of Holland cloth 11. Aluminum foil may be substituted for the Holland cloth.

In applying my improved patch, the Holland cloth is first stripped off leaving the adhesive 10 in sticky condition; the inner surface of the casing is scraped clean around the rupture for an area equal to that of the patch and then the patch is centered over the rupture and its adhesive surface 10 is pressed firmly into contact with the scraped surface.

The inner tube 12 may then be replaced and inflated with air and the casing and tire are ready for use.

Having thus fully described my invention and illustrated it to the best of my ability, what I claim as new and wish to secure by Letters Patent of the United States, is—

1. That method of prestretching cords which comprises forming the cords in side-by-side relation into a fabric to have the cords bonded by uncured rubber; applying a mass of uncured rubber at the centers of the cord lengths; pressing the rubber mass against the cords sufficiently to set up a lateral flow thereof and permitting that lateral flow to continue while maintaining said pressure, whereby the friction of the flowing rubber stretches the cords beginning at their central portions and then continuing the stretching as the rubber flows toward the cord ends; and heating the rubber to vulcanize it to maintain the cords in stretched condition.

2. That method of forming a casing patch from cord fabric which comprises forming the cords into narrow widths of side-by-side cords bonded together with rubber to form the fabric; placing one fabric width upon another in central crisscross arrangement; placing a mass of uncured rubber on this pile over the crossing zone; applying pressure to the rubber substantially normal to the fabric widths and permitting flow of rubber from said mass by reason of said pressure laterally from said zone along said cords toward their outer ends; said widths being sufficiently narrow as to prevent undue shifting of the cords laterally one from another in said widths at least centrally thereof.

3. That method of forming a casing patch from cord fabric which comprises forming the cords into narrow widths of side-by-side cords bonded together with rubber to form the fabric; placing one fabric width upon another in central criss-cross arrangement; placing a mass of uncured rubber on this pile over the crossing zone; applying pressure to the rubber substantially normal to the fabric widths and permitting flow of rubber from said mass by reason of said pressure laterally from said zone along said cords toward their outer ends; said widths being sufficiently narrow as to prevent undue shifting of the cords laterally one from another in said widths at least centrally thereof, and vulcanizing the rubber to maintain said stretching.

4. That method of forming a casing patch from cord fabric which comprises forming the cords into narrow widths of side-by-side cords bonded together with rubber to form the fabric; placing one fabric width upon another in central criss-cross arrangement; placing a mass of uncured rubber on this pile over the crossing zone; applying pressure to the rubber substantially normal to the fabric widths and permitting flow of rubber from said mass by reason of said pressure laterally from said zone along said cords toward their outer ends; said widths being sufficiently narrow as to prevent undue shifting of the cords laterally one from another in said widths at least centrally thereof, and vulcanizing the rubber to maintain said stretching; and applying a coating of rubber cement on the side of the patch opposite to the side on which said mass of rubber was initially applied; and applying a protective, removable member over said cement.

5. That method of forming a casing patch from cord fabric which comprises forming the cords into narrow widths of side-by-side cords bonded together with rubber to form the fabric; placing one fabric width upon another in central criss-cross arrangement; placing a mass of uncured rubber on this pile over the crossing zone; applying pressure to the rubber substantially normal to the fabric widths and permitting flow of rubber from said mass by reason of said pressure laterally from said zone along said cords toward their outer ends; said widths being sufficiently narrow as to prevent undue shifting of the cords laterally one from another in said widths at least centrally thereof, said pressure equalling at least that pressure to which the patch will be subjected when in use.

6. In a method of forming a patch, those steps which consist of disposing a mass of rubber at the central zone only of a plurality of cords, and of applying pressure normally to the rubber and cords to cause the rubber to flow laterally from said zone, which lateral flow sets up a frictional drag along the individual cords tending to stretch them outwardly from their central portions.

7. In a method of forming a patch, those steps which consist of crossing a plurality of cords to form a central crossing zone, of disposing a block of rubber over the central zone only, and of applying pressure normally to the assembly to cause the rubber to flow laterally from said zone along said cords frictionally engaging therewith and thereby stretching them outwardly from that zone.

8. In a method of forming a patch, those steps which consist of disposing a mass of rubber at the central zone only of a plurality of cords, and of applying pressure normally to the rubber and cords to cause the rubber to flow laterally from said zone, which lateral flow sets up a frictional drag along the individual cords tending to stretch them outwardly from their central portions, and of vulcanizing the rubber while said pressure is maintained after completion of said flow.

9. In a method of forming a patch, those steps which consist of disposing a mass of rubber at the central zone only of a plurality of cords, and of applying pressure normally to the rubber and cords to cause the rubber to flow laterally from said zone, which lateral flow sets up a frictional drag along the individual cords tending to stretch them outwardly from their central portions, the quantity of said rubber in said mass being sufficient to flow beyond the ends of said cords, said pressure being maintained until said rubber extends beyond the cord ends, and of vulcanizing the rubber while said pressure is maintained.

THOMAS W. MULLEN.